B. N. HAWES.
APPARATUS FOR MERGING BUTTER AND MILK.
APPLICATION FILED NOV. 4, 1908.
933,558. Patented Sept. 7, 1909.
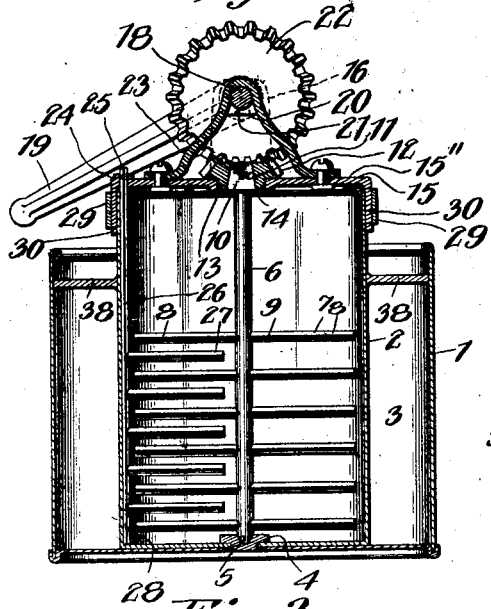
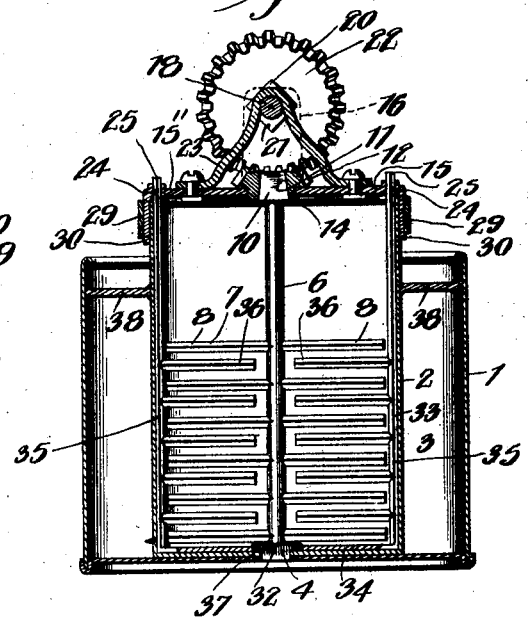
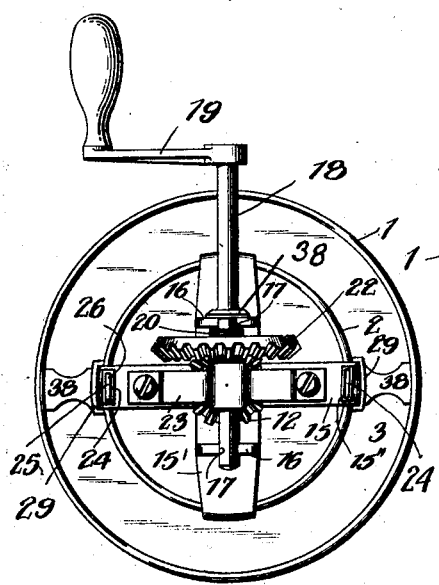
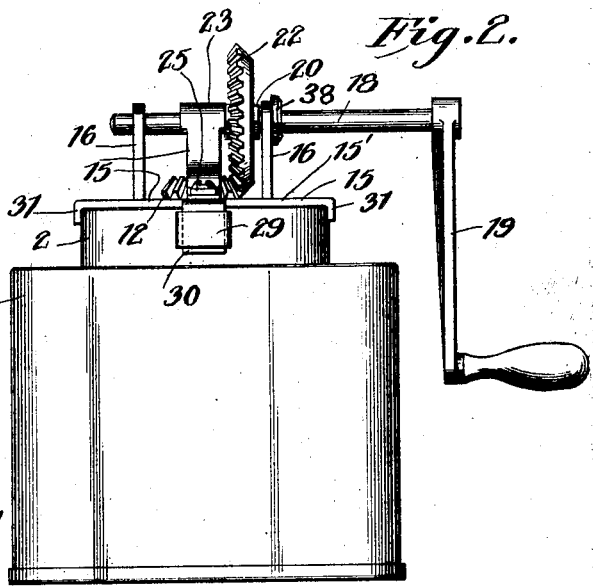
Witnesses
W. H. Rockwell
Frank G. Brereton
Inventor
Benjamin N. Hawes
By
Attorney

UNITED STATES PATENT OFFICE.

BENJAMIN N. HAWES, OF WASHINGTON, DISTRICT OF COLUMBIA, ASSIGNOR TO HIMSELF AND TITIAN W. JOHNSON, OF WASHINGTON, DISTRICT OF COLUMBIA.

APPARATUS FOR MERGING BUTTER AND MILK.

933,558.

Specification of Letters Patent.

Patented Sept. 7, 1909.

Application filed November 4, 1908. Serial No. 460,991.

*To all whom it may concern:*

Be it known that I, BENJAMIN N. HAWES, a citizen of the United States, residing at Washington, in the District of Columbia, have invented certain new and useful Improvements in Apparatus for Merging Butter and Milk, of which the following is a specification.

This invention relates to an apparatus for emulsifying butter and milk, or merging butter and milk together.

The object of the invention is to provide a simple and inexpensive apparatus for merging butter and milk, and one in which the parts may be readily assembled and taken apart.

In the drawings, Figure 1 is a central sectional view of the apparatus; Fig. 2 is a side elevation; Fig. 3 is a top plan view; and Fig. 4 is a central sectional view showing a modified form of mixer frame which acts in conjunction with the rotary mixer.

The numeral 1 designates the outer vessel which is preferably cylindrical in shape and the numeral 2 designates the inner vessel. The two vessels are spaced apart to form a water chamber 3. Soldered or otherwise secured to the bottom of the inner vessel, is a plug 4, having therein a depression 5, preferably conical in shape, for the reception of the conical end of the shaft 6, of the rotary mixer 7. This mixer is provided with a plurality of oppositely extending arms 8 preferably elliptical in cross section, so as to present cutting edges 9. The top of the shaft 6 is squared as indicated at 10 to fit in a correspondingly shaped opening 11 of a bevel gear 12 which has a boss 13 extending through a circular opening 14, in the center of a support 15. The support 15 is provided with four arms 15′, and 15″. Formed integral with the arms 15′ are two standards 16, bifurcated at 17 to form bearings for the operating shaft 18, to which is integrally attached a crank 19. The shaft is squared at 20 where it passes through the squared opening 21 in the beveled gear wheel 22, which is in mesh with the wheel 12. The shaft is held in position and the wheels are held in mesh by a clamp 23, which bears at its central portion upon the shaft, and the clamp is bolted to the arms 15″. The arms 15″ are provided with elongated openings 24, either of which may receive the upper end 25 of a finger frame 26, the fingers 27 of which project between the arms or blades of the rotary mixer 7. The lower end of the finger frame is stepped into a socket 28, which is soldered or otherwise secured to the inner receptacle, at or near the bottom thereof.

The numeral 29 designates the oppositely disposed brackets soldered or otherwise secured to the outside of the inner receptacle, which brackets are adapted to receive the downwardly extending tongues 30 of the arms 15″ of the support, whereby the said support is prevented from turning on the receptacle.

The outer receptacle is of considerably less height than the inner receptacle, and this is made so for the purpose of preventing the likelihood of water as it is being poured into the outer cylinder, from passing into the inner cylinder. The plug 4 extends slightly through the outer receptacle, preferably, and the two receptacles are preferably soldered together around the plug, as shown.

The arms 15′ of the support are, like the arms 15″ provided with depending tongues 31 which overhang the edge of the inner receptacle when the apparatus is assembled.

The plug 4 is preferably squared as indicated at 32 to adapt it for use in conjunction with the modified form of finger frame 33 shown in Fig. 4. This finger frame is formed of a horizontal arm 34 and two oppositely disposed arms 35, each of which latter arms is provided with a plurality of fingers 36, through which the arms or blades of the rotary mixer pass when the machine is operated. The arm 34 of the frame is provided with a squared opening 37 which fits snugly over the squared end of the plug 4 and the upper ends 37 of the frame extend through the openings 24 in the arms 15″ of the support for the rotating mechanism. This frame, as in the case of the frame 26, may be readily removed after the product is made, so that the product may be easily removed from the inner receptacle and the apparatus parts be more readily cleaned.

In addition to soldering the inner receptacle to the outer receptacle, I provide short braces 38 whose ends are soldered to the inner and outer receptacles.

The numeral 38 designates a collar which is integral with the operating shaft, which collar is adapted to abut against one of the standards. This collar or abutment in conjunction with the squared portion of the shaft upon which the larger gear wheel is mounted, forms a recess into which the upper end of the standard extends, which construction prevents the lateral movement of the shaft in its bearings and does away with the necessity of drilling the shaft for the insertion of pins or with the use of wires or other device for preventing lateral movement. The construction is such that the parts may be readily and cheaply assembled, since obviously it is only necessary to mount the gear wheel upon the shaft, place the shaft in its bearings, with the abutments on either side of one of the standards, and secure the clamp yoke in place, thus keeping all of the parts in their proper relative position.

In operation, the butter is first broken or cut into lumps or pieces, preferably of small size and placed in the inner vessel or receptacle, which I call the mixing chamber, and one pint of milk is added thereto. Warm water is then placed in the space around the mixing chamber, or in what I term the heating chamber and the mixer is rotated. The heat of the water gradually warms the butter and milk, uniformly and increasingly and the rotary mixer is in the meantime rotated causing rapid agitation of the milk and butter, which is continued until a permanent and stable emulsion of the milk and butter is effected. The construction of the machine is such that after the heat of the water in the heating chamber has been utilized to soften the butter and bring it to condition for agitation the whole apparatus may be placed under a faucet and cold water allowed to run into the outer cylinder, displacing the warm water, or lowering the temperature thereof, during the operation of the machine, which operation is continued until the product is brought to a satisfactory consistency, when it is removed from the apparatus and used as ordinary or standard butter is used. The product is such that it may be refrigerated and hardened as in the case of ordinary butter. A proper amount of coloring matter, if desired, may be added to the product, and it is preferable to add the coloring matter during agitation, as obviously the color will be more uniformly distributed throughout the mass.

Claims.

1. In a machine of the character described, the combination with a vessel, provided with brackets, of a support composed of two bars, one of said bars having its ends adapted to engage the brackets, and the other provided with oppositely disposed standards, a rotatable shaft journaled in the standards, a clamp yoke secured to the first mentioned bar and embracing the shaft, whereby said shaft is held in its bearings in the standards, a rotatable mixer provided with a gear wheel, a gear wheel mounted on the shaft and meshing with the gear wheel on the mixer, and means for revolving said shaft and thereby the mixer.

2. In a machine of the character described, the combination with a vessel provided with brackets, of a support composed of two bars, one of said bars having its ends adapted to engage the brackets and the other provided with oppositely disposed standards having open slots in their upper ends, a rotatable shaft having bearings in said slots, a clamp yoke secured to the first mentioned bar and embracing the shaft, whereby said shaft is held in position in its bearings in the standard, a rotatable mixer, provided with a gear wheel, a gear wheel mounted on the shaft, and meshing with the gear wheel of the mixer, means for revolving the said shaft and thereby the mixer.

3. In a machine of the character described, the combination with a vessel provided with brackets, of a support composed of two bars, one of said bars having its ends adapted to engage the brackets and the other provided with oppositely disposed standards, a rotatable shaft journaled in the standards, a clamp yoke carried by the first mentioned bar and embracing the rotatable shaft, whereby it is held in its bearings in the standards, abutments carried by the shaft adapted to come, when the parts are assembled, one on each side of the standards, whereby the lateral movement of the shaft is prevented, a rotatable mixer provided with a gear wheel, a gear wheel mounted on the shaft and meshing with the gear wheel on the mixer, and means for revolving said shaft and thereby the mixer.

In testimony whereof I affix my signature in presence of two witnesses.

BENJAMIN N. HAWES.

Witnesses:
FRANK G. BRERETON,
WM. H. BRERETON.